No. 816,582. PATENTED APR. 3, 1906.
G. KERR.
NON-REFILLABLE BOTTLE.
APPLICATION FILED AUG. 15, 1905.
2 SHEETS—SHEET 1.
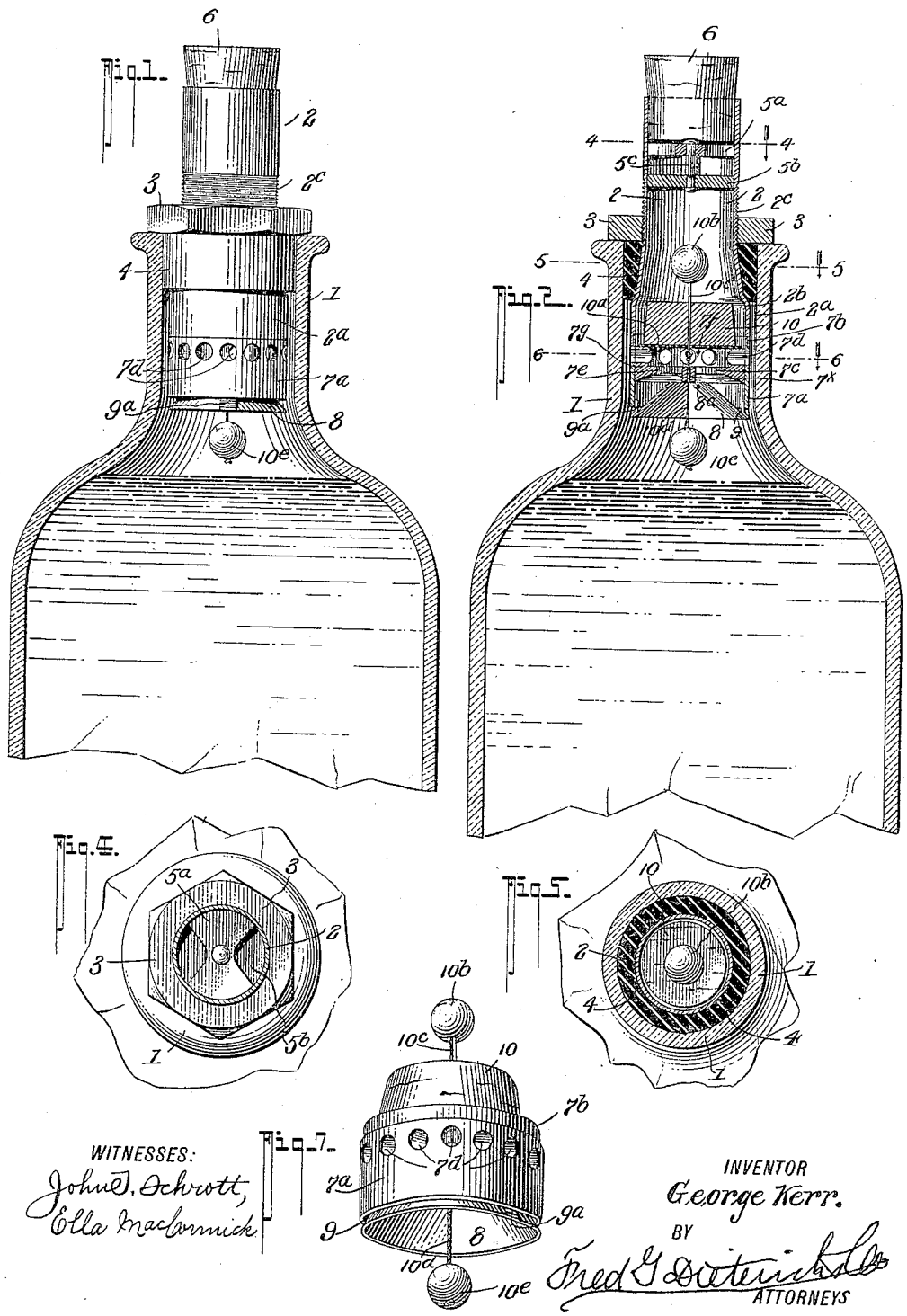
WITNESSES:
John D. Schrott,
Ella MacCormick
INVENTOR
George Kerr.
BY
Fred G. Dieterich
ATTORNEYS

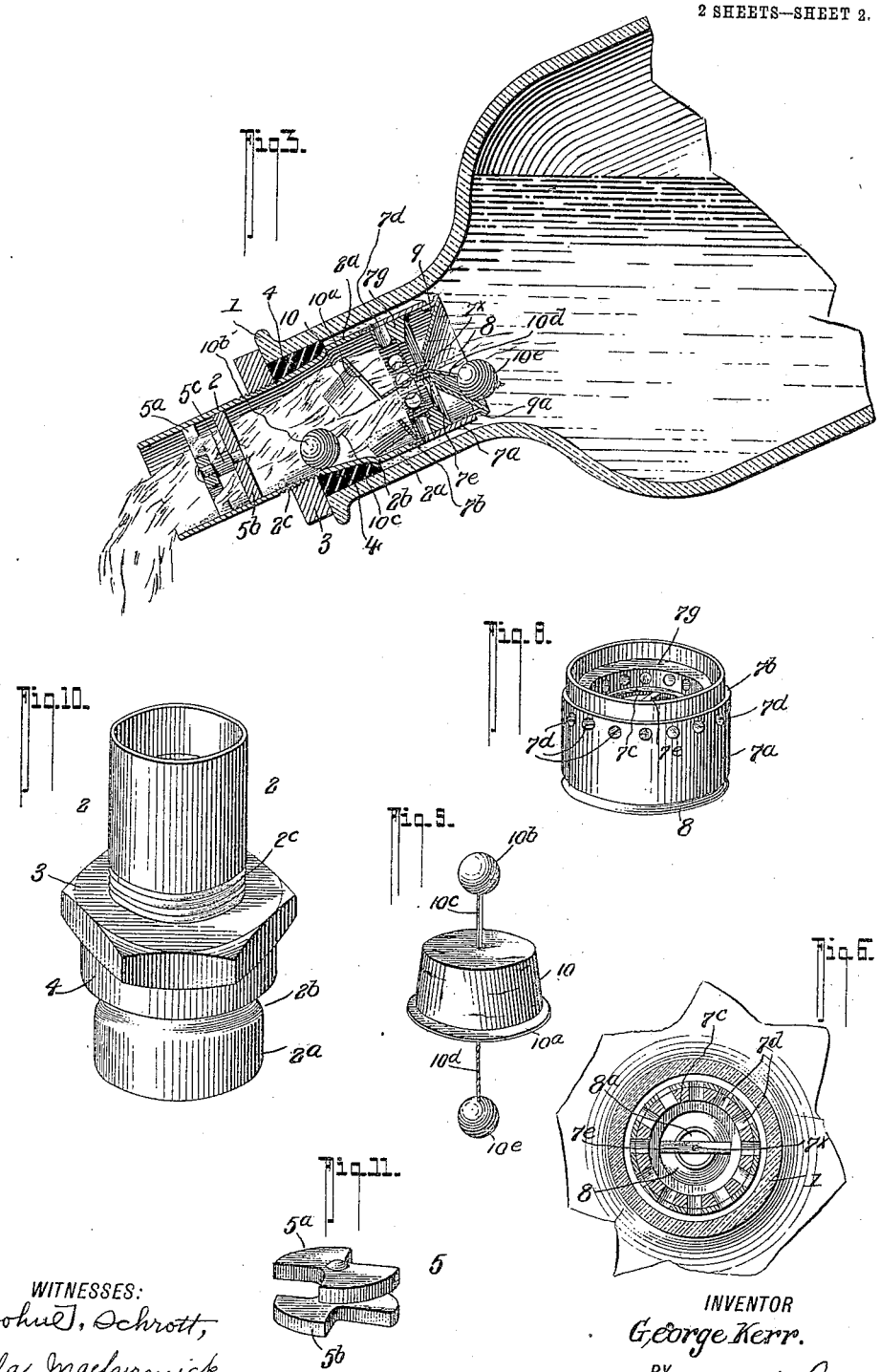

UNITED STATES PATENT OFFICE.

GEORGE KERR, OF DALLAS, OREGON.

NON-REFILLABLE BOTTLE.

No. 816,582.　　　　Specification of Letters Patent.　　　　Patented April 3, 1906.

Application filed August 15, 1905. Serial No. 274,284.

*To all whom it may concern:*

Be it known that I, GEORGE KERR, residing at Dallas, in the county of Polk and State of Oregon, have invented certain new and useful Improvements in Non-Refillable Bottles, of which the following is a specification.

My invention relates to certain new and useful improvements in bottles, and it particularly seeks to provide a non-refillable bottle of a very simple and economical construction which will effectively serve its intended purposes.

In its generic nature my invention comprises a tubular casing adapted to be inserted into the neck of a bottle, means for securing the casing to the bottle-neck, a mechanism consisting of a supplemental section adapted to fit into and forming a continuation of the first casing-section and having a valve-seat therein, a valve adapted to rest on said valve-seat, said valve being of the "floating" type, means carried by said valve for overcoming the suction of the valve when the bottle is in its pouring position, means coöperating with the supplemental casing and the valve-seat for admitting air into the bottle, and a funnel member secured to the bottom of the supplemental casing and projecting toward the valve-seat with its small opening adjacent thereto to serve as a guide for the outgoing liquid, so as to insure proper operation of the device and to permit the ready ingress of air, and thus prevent gurgling.

With other objects in view than have been heretofore enumerated my invention also comprises certain novel construction, combination, and arrangement of parts, all of which will be first described in detail, and then be specifically pointed out in the appended claims, reference being had to the accompanying drawings, in which—

Figure 1 is a side elevation of my invention as applied to a bottle, the bottle being shown in vertical section. Fig. 2 is a vertical longitudinal section of my invention with the bottle in its non-pouring position. Fig. 3 is a similar view with the bottle in its pouring position. Fig. 4 is a horizontal section on the line 4 4 of Fig. 2. Fig. 5 is a similar view on the line 5 5 of Fig. 2. Fig. 6 is a similar view on the line 6 6 of Fig. 2. Fig. 7 is a detail view of the valve-carrying supplemental tubular section with its carried parts. Fig. 8 is a similar view of the supplemental tubular section with the valve removed. Fig. 9 is a detail perspective view of the valve *per se.* Fig. 10 is a detail perspective view of the main tubular section. Fig. 11 is a similar view of the guard member.

Referring now to the accompanying drawings, in which like numerals of reference indicate like parts in all of the figures, 1 designates the bottle-neck, into which the tubular member 2 is adapted to be inserted, and the tubular member 2 is of a slightly less diameter than the bottle-neck to leave a space between the member 2 and the bottle-neck. At its lower end the member 2 has an enlargement $2^a$, forming a shoulder $2^b$, as shown, and the member $2^a$ adjacent the shoulder $2^b$ is provided with a threaded portion $2^c$ to receive the securing-nut 3, as shown, a rubber or resilient washer 4 being placed around the tubular neck or member 2 between the shoulder $2^b$ and the nut 3, so that when the nut 3 is screwed down tight the washer 4 will be expanded to tightly fit the bottle-neck and hold the parts in place, and as an additional fastening means the nut 3 can be cemented to the bottle-neck, or it may be soldered to the member 2 or secured by any other similar means desired.

In the upper portion of the tubular member or neck 2 a guard 5, consisting of the upper and lower members $5^a$ and $5^b$, respectively, secured together by the shank $5^c$, is held. The guard 5 is spaced sufficiently below the upper edge of the tubular member or neck 2 to permit insertion of the usual cork 6, as shown.

The valve mechanism comprises the tubular casing $7^a$, having an annular seat $7^b$ at its upper edge to fit into the enlargement $2^a$ of the tubular section 2 and to form a continuation thereof, as shown. The tubular extension or casing $7^a$ of the valve mechanism has an annular valve-seat $7^g$, which has its valve-engaging face spaced with its upper edge in a plane slightly below the upper edge of the member $7^a$, and the valve-seat $7^g$ is provided with an internal annular flange $7^c$ and also with a plurality of annular radially-disposed apertures $7^d$ above the flange $7^c$, as shown, a cross-bar $7^e$ being secured diagonally across the pouring-aperture $7^f$ to the flange $7^c$ for a purpose presently understood.

8 designates a funnel member arranged with its smaller aperture $8^a$ adjacent the valve-seat $7^g$ and held with its smaller end arranged to discharge through the aperture $7^f$ in the valve-seat, while the large end of the funnel member 8 has its lowermost edge projected in a plane slightly below the lowermost edge of the tubular casing $7^a$ of the valve to leave an annular space or opening 9 between the funnel member 8 and the casing $7^a$ for a purpose presently understood. Supporting members $9^a$ secure the funnel member 8 in position.

Arranged to seat on the valve-seat $7^g$ is a valve 10, composed of cork or other suitable buoyant material whose lower face is provided with a rubber disk or washer $10^a$ to insure tight sealing of the bottle through the valve-seat when the valve is seated therein.

$10^b$ designates a ball or weight mounted on the upper end of a resilient spring-arm $10^c$, secured to the valve 10, as shown, while a cord or flexible wire $10^d$ passes downward from the center of the valve 10 through an aperture $7^x$ in the cross-bar $7^e$ and has a ball-weight $10^e$ connected thereto at its lower end to hold the valve 10 firmly on its seat when the bottle is in the position shown in Figs. 1 and 2. The ball or weight $10^b$ serves to insure the valve 10 being tipped over at an angle to its seat when the parts are in the position shown in Fig. 3 to pour out the liquid contents of the bottle and to serve at times in connection with its arm $10^c$ as an agitating means.

So far as described the manner in which my invention operates will be best explained as follows: The casing 2, with the valve-casing $7^a$ attached, is inserted into a bottle-neck, with the nut 3 unscrewed to allow the washer 4 to assume its lesser diameter. As soon as the section 2 has been placed in proper position in the bottle-neck the nut 3 is screwed down, as before mentioned, until the washer 4 is sufficiently expanded to tightly secure the parts in the bottle-neck, after which the nut 3 may be secured from turning in any desired manner. The bottle is now ready to be emptied. As soon as the bottle is slightly inverted to pour out the contents thereof the valve 10 will leave its seat and permit the liquid to pass out of the bottle. The liquid passing through the funnel member $8^a$ is directed in a stream through the valve-seat $7^g$, thus allowing plenty of room for the air to enter the bottle through the tubular section 2, the apertures $7^d$ in the valve-seat, and the passage 9 between the funnel 8 and the casing $7^a$, thus always insuring proper air-feed into the bottle as the contents thereof is poured out, and positively preventing the gurgling of the fluid as it passes out.

From the foregoing description, taken in connection with the accompanying drawings, it is thought the complete construction, operation, and many advantages of my invention will be readily understood by those skilled in the art to which it appertains, and I desire to say that many slight changes in the detail construction, operation, and arrangements of parts may be made without departing from the scope of the appended claims or the invention.

Having thus described my invention, what I desire to secure by Letters Patent is—

1. An apparatus of the class described, comprising a casing adapted to be secured within the bottle-neck, said casing having an externally-threaded portion and a washer-receiving portion, a flexible washer on said washer-receiving portion and a check-nut on said threaded portion for securing the casing in the bottle-neck, a valve mechanism detachably secured to the lower end of said casing, said valve mechanism comprising a valve-seat, a float-valve therefor, a weight pendently secured to said float-valve to normally hold the same on its seat, a second weight resiliently secured to said valve, and a guard within the tubular section substantially as shown and described.

2. An apparatus of the class described, comprising a tubular member having a washer-receiving portion, a washer thereon, said tubular member having a threaded portion, a nut on said threaded portion for expanding the washer to cause it to tightly impinge the bottle-neck, a guard within said tubular member, said tubular member adapted to receive a cork above the guard, a second tubular member secured to the lower end of the first tubular member and forming a continuation thereof, a valve-seat in said second tubular member, said valve-seat having a fluid-passage and a plurality of air-passages, a valve adapted to seat on said valve-seat, and a funnel member secured to said second tubular member below said valve-seat with its small end arranged to discharge through the fluid-passage in said valve-seat, substantially as shown and described.

3. An apparatus of the class described, comprising a tubular member having a washer-receiving portion, a washer thereon, said tubular member having a threaded portion, a nut on said threaded portion for expanding the washer to cause it to tightly impinge the bottle-neck, a guard within said tubular member, said tubular member adapted to receive a cork above the guard, a second tubular member secured to the lower end of the first tubular member and forming a continuation thereof, a valve-seat in said second tubular member, said valve-seat having a fluid-passage and a plurality of air-passages, a valve adapted to seat on said valve-seat, a funnel member secured to said second tubular member below said valve-seat with its small end arranged to discharge through the fluid-passage in said valve-seat, said valve having a pendent weight for normally holding it on its seat.

4. An apparatus of the class described, comprising a tubular member having a washer-receiving portion, a washer thereon, said tubular member having a threaded portion, a nut on said threaded portion for expanding the washer to cause it to tightly impinge the bottle-neck, a guard within said tubular member, said tubular member adapted to receive a cork above the guard, a second tubular member secured to the lower end of the first tubular member and forming a continuation thereof, a valve-seat in said second tubular member, said valve-seat having a fluid-passage and a plurality of air-passages, a valve adapted to seat on said valve-seat, a funnel member secured to said second tubular member below said valve-seat with its small end arranged to discharge through the fluid-passage in said valve-seat, said valve-seat having a pendent weight for normally holding it on its seat, and a second weight flexibly secured to said valve to form an agitator substantially as shown and described.

5. An apparatus of the class described, comprising a tubular member having a washer-receiving portion, a washer thereon, said tubular member having a threaded portion, a nut on said threaded portion for expanding the washer to cause it to tightly impinge the bottle-neck, a guard within said tubular member, said tubular member adapted to receive a cork above the guard, a second tubular member secured to the lower end of the first tubular member and forming a continuation thereof, a valve-seat in said second tubular member, said valve-seat having a fluid-passage and a plurality of air-passages, a valve adapted to seat on said valve-seat, a funnel member secured to said second tubular member below said valve-seat with its small end arranged to discharge through the fluid-passage in said valve-seat, said valve having a pendent weight for normally holding it on its seat, a second weight flexibly secured to said valve to form an agitator, said funnel member being spaced from the periphery of said second tubular member to form a passage therebetween substantially as shown and described.

6. An apparatus of the class described, comprising a tubular member having a washer-receiving portion, a washer thereon, said tubular member having a threaded portion, a nut on said threaded portion for expanding the washer to cause it to tightly impinge the bottle-neck, a guard within said tubular member, said tubular member adapted to receive a cork above the guard, a second tubular member secured to the lower end of the first tubular member and forming a continuation thereof, a valve-seat in said second tubular member, said valve-seat having a fluid-passage and a plurality of air-passages, a valve adapted to seat on said valve-seat, a funnel member secured to said second tubular member below said valve-seat with its small end arranged to discharge through the fluid-passage in said valve-seat, said valve having a pendent weight for normally holding it on its seat, a second weight flexibly secured to said valve to form an agitator, said funnel member being spaced from the periphery of said second tubular member to form a passage-way between, an apertured bridge member secured to said valve-seat, substantially as shown and described.

7. An apparatus of the class described, comprising a tubular member having an enlarged lower end, a washer-receiving portion and a threaded portion, a washer surrounding said tubular member on said washer-receiving portion, a nut adapted to coöperate with said threaded portion to expand the washer and force it to tightly engage the bottle-neck, a valve mechanism comprising a second tubular member detachably secured to said enlarged portion of said first tubular member and forming an extension thereof an annular valve-seat within said second tubular member, said valve-seat having a fluid-passage and a plurality of radially-arranged apertures communicating with said fluid-passage and the exterior of the second tubular member, a cross-bar secured to said valve-seat and passing across the fluid-passage thereof, a valve adapted to seat on said valve-seat and comprising a buoyant portion and a washer portion, a flexible member secured to the bottom of said valve and passing through an aperture in said cross-bar, a weight secured to said flexible member to normally hold the valve seated, all being arranged as shown and described.

8. An apparatus of the class described, comprising a tubular member having an enlarged lower end, a washer-receiving portion and a threaded portion, a washer surrounding said tubular member on said washer-receiving portion, a nut adapted to coöperate with said threaded portion to expand the washer and force it to tightly engage the bottle-neck, a valve mechanism comprising a second tubular member detachably secured to said enlarged portion of said first tubular member and forming an extension thereof, an annular valve-seat within said second tubular member, said valve-seat having a fluid-passage and a plurality of radially-arranged apertures communicating with said fluid-passage and the exterior of the second tubular member, a cross-bar secured to said valve-seat and passing across the fluid-passage thereof, a valve adapted to seat on said valve-seat and comprising a buoyant portion and a washer portion, a flexible member secured to the bottom of said valve and passing through an aperture in said cross-bar, a weight secured to said flexible member to normally hold the valve seated, a spring member secured to said valve, and projected upwardly therefrom, and a weight secured to the end of said spring member substantially as shown and described.

9. An apparatus of the class described, comprising a tubular member having an enlarged lower end, a washer-receiving portion and a threaded portion, a washer surrounding said tubular member on said washer-receiving portion, a nut adapted to coöperate with said threaded portion to expand the washer and force it to tightly impinge the bottle-neck, a valve mechanism comprising a second tubular member detachably secured to said enlarged portion of said first tubular member and forming an extension thereof, an annular valve-seat within said second tubular member, said valve-seat having a fluid-passage and a plurality of radially-arranged apertures communicating with said fluid-passage and the interior of the second tubular member, a cross-bar secured to said valve-seat and passing across the fluid-passage thereof, a valve adapted to seat on said valve-seat and comprising a buoyant portion and a washer portion, a flexible member secured to the bottom of said valve and passing through an aperture in said cross-bar, a weight secured to said flexible member to normally hold the valve seated, a spring member secured to the valve, and projected upwardly therefrom, and a weight secured to the end of the spring member, a funnel-shaped member secured to and spaced from said second tubular member with its small end discharging into the fluid-passage of the valve-seat, substantially as shown and described.

10. An apparatus of the class described, comprising a tubular member having an enlarged lower end, a washer-receiving portion and a threaded portion, a washer surrounding said tubular member on said washer-receiving portion, a nut adapted to coöperate with said threaded portion to expand the washer and force it to tightly engage the bottle-neck, a valve mechanism comprising a second tubular member detachably secured to said enlarged portion of the first tubular member and forming an extension thereof, an annular valve-seat within said second tubular member, said valve-seat having a fluid-passage and a plurality of radially-arranged apertures communicating with said fluid-passage and the exterior of the second tubular member, a cross-bar secured to said valve-seat and passing across the fluid-passage thereof, a valve adapted to seat on said valve-seat and comprising a buoyant portion and a washer portion, a flexible member secured to the bottom of said valve and passing through an aperture in said cross-bar, a weight secured to said flexible member to normally hold the valve seated, a funnel-shaped member secured to and spaced from said second tubular member with its small end discharging into the fluid-passage of the valve-seat substantially as shown and described.

GEORGE KERR.

Witnesses:
WESLEY J. ATCHESON,
OMER C. DOLE.